Patented Apr. 1, 1924.

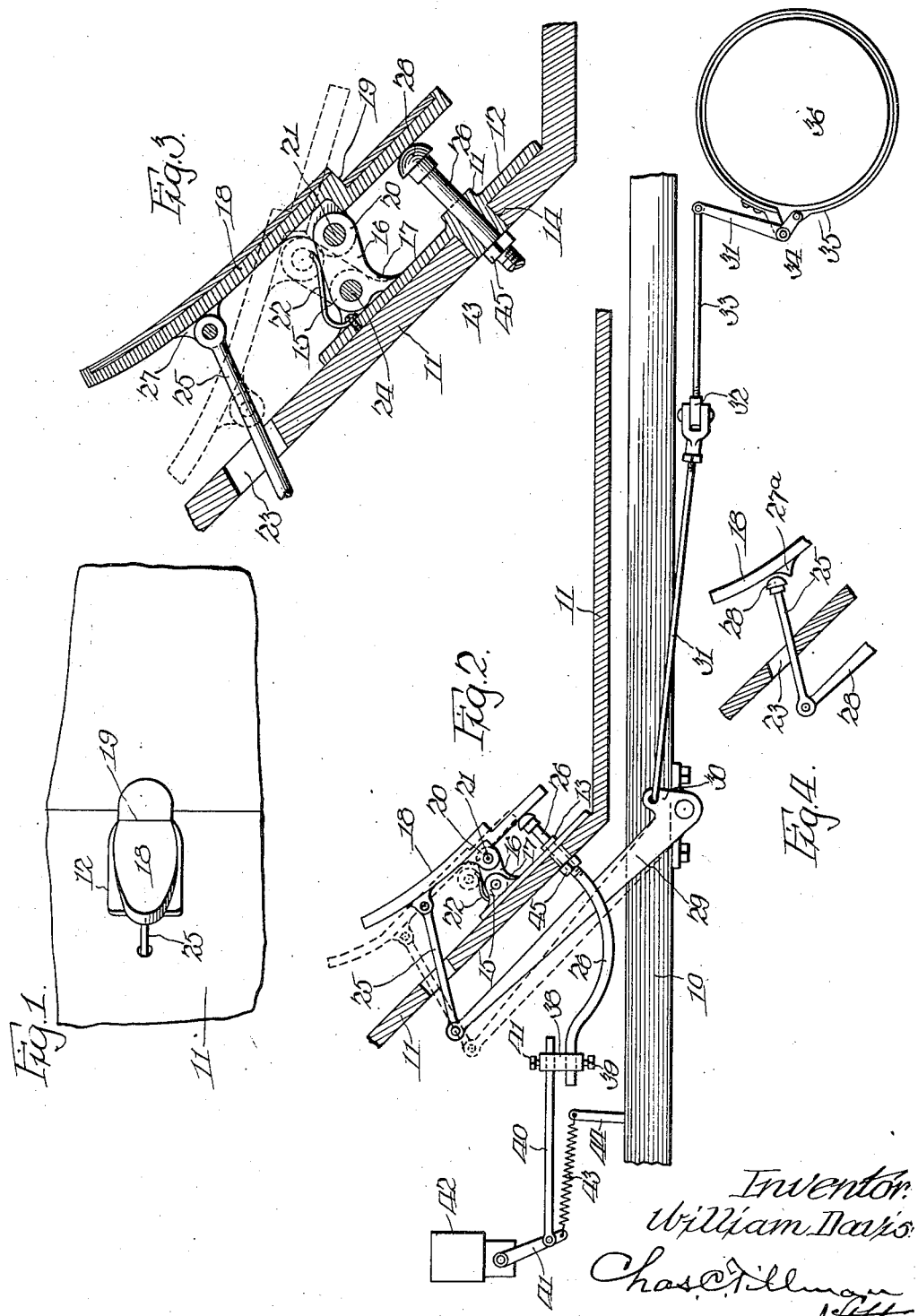

1,489,025

UNITED STATES PATENT OFFICE.

WILLIAM DAVIS, OF CHICAGO, ILLINOIS.

COMBINED ACCELERATOR AND BRAKE CONTROLLING MECHANISM.

Application filed August 20, 1923. Serial No. 658,259.

*To all whom it may concern:*

Be it known that I, WILLIAM DAVIS, a citizen of the United States, and a resident of Chicago, in the county of Cook and State of Illinois, have invented certain new and useful Improvements in a Combined Accelerator and Brake Controlling Mechanism, of which the following is a specification.

My present invention is directed particularly to a pedal, and its mount, for use in connection with means for operating valved and pressure or friction applying devices, whereby operative parts connected to said devices may be so actuated by said means as to properly and accurately control the action or operation thereof, but has general relation to controlling means for accelerators and brakes of motor driven vehicles, and especially those of automobiles.

While the invention is more particularly intended for use in connection with and for controlling the operation of an accelerator of a well known type and in connection with and for controlling the operation of a brake mechanism, and while I have shown it so in the accompanying drawings and will hereinafter so describe it, yet I wish it to be distinctly understood that I do not desire to be limited in its application or use but may employ it wherever and for any use that it may be found applicable, without a departure from the spirit of the invention.

The invention is quite similar in many respects to that disclosed in my co-pending application Serial No. 636,950, filed May 5, 1923, for improvements in a combined accelerator and brake controlling mechanism, and the principal object of the present invention is to provide a unitary device for controlling the accelerator and brake, or rather, for controlling the operating parts or connections leading to an accelerator and brake, or their equivalents, without the necessity of employing a separate device for each, as has heretofore been the general practice, in which the pedal or foot rest of the mechanism shall be so constructed and mounted as to afford a more comfortable rest or support for the foot of the operator, than has heretofore generally been provided, and so that, in the operation of the mechanism, but a very slight tiltable movement of the pedal in one direction is all that is required for controlling the operative parts leading to one of the devices to be operated, while, but a slight forward movement in substantially a parallel plane with the base support of the pedal, is all that is necessary for controlling the operative parts or connections leading to the other device to be operated, yet if desired, the last named movement can be changed into a downwardly tiltable one of any desired degree.

A further object is to provide means for restoring the pedal and its connections to their normal positions, after having been operated and released of pressure.

Other objects and advantages of the invention are the same as some of those set forth in my aforesaid co-pending application. The invention will be explained and more readily understood when read in conjunction with the accompanying drawing, in which embodiments of which the invention is susceptible, is set forth, it being understood that changes and modifications may be resorted to without departing from the spirit of the invention, so long as they come within the scope of the appended claims forming a part hereof.

Referring to the drawing—

Fig. 1 is a plan view of the front part of a portion of an automobile body showing a controlling mechanism embodying the invention mounted thereon.

Fig. 2 is a view partly in section and partly in elevation of the front part of an automobile frame and its body, showing by continuous lines a controlling mechanism embodying the invention mounted thereon with its parts in their normal positions, and by dotted lines about the position the pedal will be caused to assume in the movement thereof for controlling the operative parts leading to one of the devices to be operated by the mechanism.

Fig. 3 is a similar but enlarged view of a portion of the automobile body with parts of the mechanism mounted thereon and illustrating by dotted lines one of the positions which the pedal may be caused to assume, and Fig. 4 is a sectional view of a portion of the automobile body, a part of the pedal and a portion of connections leading to one of the parts to be operated by the device illustrating a modification in the construction of the pedal.

Like numerals of reference refer to corresponding parts throughout the different views of the drawing.

The reference numeral 10 designates a portion of the frame of an automobile, on which is mounted in the usual or any well known way, the body of the automobile, the front portion 11 only of which is shown in the drawing.

Mounted on this front portion 11 or foot rest part of the automobile is a base plate or support 12 which by preference is provided near one of its ends with a hollow enlargement 13 which is seated in a suitable opening 14 provided in the portion 11 of the automobile body, and which enlargement is for the reception and operation of a part of the mechanism, as will be presently explained. The upper surface of the support 12 is provided between the upper end of the enlargement 13 and one of its ends with a pair of spaced and upwardly extended apertured lugs or ears 15 between which is pivotally mounted one end of a link 16 which is provided on its lower portion with a foot or projection 17 adapted to rest on the base or support 12 when the parts of the device are in their normal positions, as shown in Figs. 2 and 3 of the drawing. The pedal of the device is designated by the numeral 18 and is by preference in the form of the bottom of a shoe and has near one of its ends an offset 19 against which the front portion of the heel of the shoe of the operator may rest while the sole of said shoe may lie on the upper surface of the main portion of the pedal. This pedal is provided on its lower surface in front of the offset portion 19, with a pair of depending and apertured lugs 20 which are spaced and between which the upper end of the link 16 is pivotally held by a suitable pivot 21.

Secured at one of its ends to the portion of the base plate or support 12 opposite the projection 17 of the link 16 is a spring 22 which rests against the upper portion of the link 16 and exerts its tension against the same so as to normally hold the link in the position shown in Figs. 2 and 3 of the drawing, in which position it will be understood that the projection 17 will contact with the base or support 12 and prevent further movement of the link in the direction of said projection.

Mounted for reciprocation or back and forth movement through a suitable opening 23 in the portion 11 of the automobile body and through the opening of the enlargement 13 of the plate 12 at suitable distances from the pivot 24 of the link 16, are controlling rods 25 and 26, the upper end of the rod 25 being pivotally connected to a depending lug 27 on the pedal 18 and the rod 26 having on its upper end a rounded knob 28 to contact with the lower surface of the pedal for the purpose of reducing friction incident to the contact of said parts. The controlling rod 25, has its lower end pivotally secured to the front or free end of the longer arm of a bell-crank-lever 29 which is fulcrumed on a suitable support below the body portion 11 and usually on the frame 10 of the automobile. The other arm 30 of the lever 29 has pivotally connected thereto one end of a link 31, the other end of which is pivotally connected to the equalizing bar 32 at about the middle of said bar.

Extended horizontally and rearwardly from each end of the equalizing bar 32 is a brake-operating rod 33, each of which is connected to a brake-band-operating mechanism designated as a whole by the reference numeral 34, which mechanism may be of the ordinary or any well known type, one of the same being shown diagrammatically in Fig. 2 of the drawing. As is well known, the operating mechanism for the brake-bands are each usually provided with a spring to normally hold the band 35 out of contact with the brake-drum 36 and in such a way that the lever 37 to which one end of the brake-rod 33 is secured, will be normally held in about the position shown in Fig. 2 of the drawing. The action of the spring for thus positioning the brake-band and said lever as above mentioned, is usually sufficient to cause the bell-crank-lever 29 and the controlling rod 25 to normally assume the positions shown in Fig. 2 of the drawing.

Mounted on the lower front end of the controlling or accelerator rod 26 is a coupling 38 through a transverse opening in the lower portion of which the rod 26 is extended and secured in position by means of a set screw 41, which link is operatively connected at its other end to the throttle valve 41ª of a carburetor 42 of a well known type, which carburetor is located and supported in the usual place or manner on the automobile.

As is well known, the throttle valve operating mechanisms of the ordinary construction, are each equipped with a spring for normally closing the throttle valve, the action of which spring is sufficient to restore the parts 26, 40 and 41 to their normal positions as shown in Fig. 2 of the drawing, after they have been actuated by the proper movement of the pedal 18 and after pressure has been removed from said pedal. However, to insure more positively the return of said parts to their normal positions, a coil spring 43 secured at one of its ends to the valve 41 and at its other end to a projection 44 on the frame 10 rearwardly of said arm may be employed.

In Fig. 4 of the drawing is shown a slight modification in the construction of the pedal 18 and in the manner of the co-operation thereof with the controlling rod 25, which modification consists in omitting the lug 27 from the pedal and providing the same with a forwardly cupped depending projection 27ª to co-operate with a rounded knob 28 on the upper end of the rod 25 with which said rod is employed in this modified form. The rod 25 has connection through the bell-crank-lever 29 with the brake mechanism 34 in the same manner as first above described and the action or operation of the parts are very similar in this modified construction to that of the first described operation, except that the upper end of the controlling rod 25 is detached from the pedal instead of being pivotally connected thereto as in the first described construction.

From the foregoing and by reference to the drawing, it will be understood and clearly seen that by my improvements a unitary device for controlling the accelerator and for controlling the brake mechanism, is furnished, for it is apparent that by placing the foot of the operator on the tiltable pedal 18, either of the controlling rods 25 or 26 can be depressed. In order to depress the controlling rod 26, slight pressure from the foot of the operator may be applied to the heel portion of the pedal 18, when the parts are in the positions shown in Figs. 2 and 3, which will cause the rear portion of the pedal to be tilted downwardly, thus operating said rod and through it the valve of the carburetor. By removing this downward pressure, the spring 43 will cause the rod 26 and its connecting members with the carburetor to assume their normal positions. The rod 25 is restricted in its rearward or upward movement by reason of a stop nut 45 mounted on the rod 26 at a point to contact with the lower end of the tubular enlargement 13 through which said rod operates.

To operate the rod 25 which controls the brake mechanism, it is only necessary to move the pedal 18 from the position shown by continuous lines in Fig. 2 to about that shown by dotted lines in said figure, when it is evident that the brake bands may be set with a certain amount of frictional pressure, but if greater frictional pressure of said bands is required or desired, the rod 26 may be further depressed by tilting the pedal 18 forwardly and downwardly to about the position shown by dotted lines in Fig. 3 of the drawing.

Having thus fully described my invention, what I claim as new and desire to secure by Letters Patent is—

1. A pedal and its mount comprising a support, a link pivoted near one of its ends on said support and having a projection to co-act with said support to restrict its pivotal movement in one direction and a pedal tiltably mounted on the other end of said link.

2. A pedal and its mount consisting of a support, a link pivoted near one of its ends on said support and having a projection to co-act with the support to restrict its movement in one direction, a spring co-operating with said link to actuate it in the direction of said projection, and a pedal tiltably mounted on the other end of said link.

3. In a device of the class described, the combination with a supporting link pivotally supported near one of its ends, of a member tiltably mounted on the other end of said link, controlling rods mounted for back and forth movement on opposite sides of said link and adapted to be moved in one direction by said tiltable member, and means operatively connecting each of said rods to a part to be operated thereby.

4. In a device of the class described, the combination with a supporting link pivotally supported near one of its ends and having means to co-act with its support to restrict its pivotal movement in one direction, of a member tiltably mounted on the other end of said link, controlling rods mounted for back and forth movement on opposite sides of said link and adapted to be moved in one direction by said tiltable member, a spring co-operating with said link to actuate it in the direction of the said restricting means, and means operatively connecting each of said rods to a part to be operated thereby.

5. The combination with a pair of spaced depressible members; of a link pivotally supported at one end between said members and movable toward or away from the latter, a pedal pivoted inwardly of its ends upon the opposite end of said link and operatively associated at one end with one of said members, and means normally holding said pedal with its opposite end operatively disposed adjacent to the other of said members.

6. The combination with a pair of spaced members to be actuated; of a tiltable pedal mounted adjacent to said members and movable bodily toward or away from and for actuating the latter, one part of said pedal positively connected with one of said members and adapted by either the bodily movable actions or tilting actions or both to contribute differing degrees of movement to said positively connected member free of any actuation of the other member.

WILLIAM DAVIS.